United States Patent Office 3,126,287
Patented Mar. 24, 1964

3,126,287
TREATMENT OF PLANT TISSUE TO PREVENT BROWNING
Bernard J. Finkle, Berkeley, Calif., assignor to the United States of America as represented by the Secretary of Agriculture
No Drawing. Filed May 16, 1962, Ser. No. 195,345
4 Claims. (Cl. 99—154)
(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to the preservation of edible plant material, such as fruits and vegetables, and is particularly concerned with the treatment of the plant material to render it resistant to browning. The objects of the invention include the provision of procedures for stabilizing edible plant materials whereby the products can be further processed and stored with maintenance of their original character, particularly as to color, texture, odor, and flavor. Further objects and advantages of the invention will be evident from the following description wherein parts and percentages are by weight unless otherwise specified.

It is well known that when most fruits and vegetables are subjected to disorganization of their natural structure as by peeling, cutting, comminuting, pitting, pulping, freezing, etc., the produce suffers deteriorative changes including the development of dark and unnatural colors (browning), softening of tissue, and development of unnatural odor and taste. These deteriorative changes are attributed to various chemical reactions catalyzed by the enzymes such as polyphenoloxidase naturally present in the plant material. The disorganization of the plant structure disrupts the natural segregation of substrates and enzymes and thus permits the enzymes to contact various substrates with the results noted above. More specifically, the browning of plant tissue is attributed to a mechanism wherein ortho-dihydroxy phenolic compounds such as catechol, caffeic acid, chlorogenic acid, or gallic acid, present in the plant tissue are oxidized through enzyme-catalyzed reactions to ortho quinones and the latter compounds polymerize, producing dark colored substances. The reaction in question is exemplified by the following formulae, using caffeic acid as a typical browning substrate:

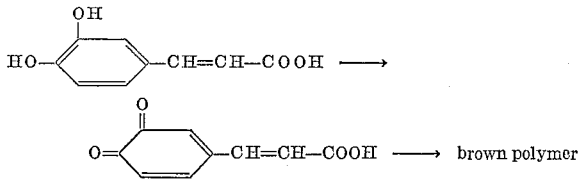

In any preservation process—whether it involves dehydration, freezing, canning, or any combination of these—one must provide some means for controlling these undesirable enzymic reactions if an acceptable product is to be produced. Various techniques are currently used for preventing or inhibiting the reactions by what may be termed an attack on the natural enzymes in the produce. Thus, these procedures have the effect of destroying, denaturing, inactivating, or otherwise attenuating the enzymes which have the ability to catalyze the oxidation of the ortho-dihydroxy phenolic substrates. For example, it is common in the food industry to subject raw fruit or vegetables to blanching with steam or hot water whereby to inactivate the enzymes. This treatment is generally effective but has the disadvantage that the produce is at least partially cooked so that it no longer tastes like the fresh food. Also, blanching causes a leaching out of valuable nutrient materials from the plant tissue. The use of sulphur dioxide and other sulphiting agents (for example, sodium sulphite or bisulphite) to inactivate enzymes is also well known in the industry. Use of these reagents, however, has the disadvantage that the flavor of the food is adversely affected. The instant invention has among its advantages the factor that browning is avoided without application of heat and without application of sulphur dioxide or other sulphiting agent.

In accordance with the present invention, raw plant material which is normally subject to enzyme-catalyzed deterioration is subjected to a treatment which so affects the substrates in the plant material that they are no longer responsive to the deteriorative enzymes. More specifically, the process of the invention causes such changes in the ortho-dihydroxy phenolic constituents (the browning precursors) that they no longer will form brown reaction products. A particularly novel aspect of the invention is that it involves an attack on the browning precursors, rather than following the conventional pattern which involves an attack on the browning enzymes. It may be noted that in applying the process of the invention, the oxidative enzymes which cause browning are not destroyed—they remain active yet unable to carry out their usual function because the substrates on which they normally act have been chemically altered, or blocked.

The objects described above may be attained in several different ways. In accordance with one aspect of the invention, the plant material is subjected to contact with an enzyme capable of causing chemical changes resulting in the blocking of one or both of the ortho-hydroxy groups of the browning precursors. A preferred enzyme for this purpose is O-methyltransferase which has the ability of converting hydroxyl groups to methoxyl groups. Thus, by applying O-methyltransferase to the plant material, the browning precursors are chemically altered by conversion of one or both of the ortho-hydroxyl groups to methoxyl groups. As a result, the browning reaction is blocked in its first stage since the precursors cannot form ortho quinones. The enzyme O-methyltransferase is known in the biochemical field and its preparation forms no part of the present invention. The enzyme is conventionally isolated from animal organs, for example, livers. In treating solid plant materials such as fruit slices in accordance with the invention, suitable contact with the enzyme is attained by immersing the fruit in an aqueous dispersion of the enzyme. Where liquid materials such as juices, pulps, or purees, are being treated the enzyme is mixed directly with the liquid plant material. Since the enzyme in question acts as a catalyst, the amount used is not critical. For optimum results, it is preferred that the system of plant material and enzyme be maintained at a pH level of about from 7 to 9. Such pH levels can be readily attained by applying any conventional non-toxic alkaline material such as an alkali metal carbonate, bicarbonate, or phosphate, or an amine, in the amount as necessitated by the natural pH of the plant material. Also, since the desired reaction involves conversion of hydroxyl to methoxyl, it is necessary that there be present at the locus of the reaction a source of methyl radicals. This may be provided by the natural components in the plant tissue or, if not present therein, may be supplied by addition of a methyl-donating compound, as, for example, methionine, S-adenosylmethionine, betaine, choline, S-methylmethionine, or dimethyl-β-propiothetin. Also, the presence of magnesium ion is required for the action of the methylating enzyme. However, this ion is virtually always present in natural plant materials and need not be added. In any event, it does no harm to add magnesium ion, for example, in the form of a non-toxic magnesium salt to supplement the natural complement in the plant tissue. The temperature of the system of plant material and enzyme is generally held in the range from about 20 to 40° C.

Another item to be mentioned is that methylation of the browning percursors does not take place instantaneously but requires a definite period of time which may be anywhere from 5 minutes to 3 hours, depending on such factors as the temperature, the type of produce, the nature of the browning precursors, and the amount of enzyme therein, etc. Thus, during the period of reaction it is necessary to maintain anaerobic conditions. The point is that oxidation takes place at a rapid rate and unless it is prevented, the produce will become brown before the desired blocking of the hydroxyl groups can take place. Anaerobic conditions may be established in several ways. One technique involves adding a minor proportion of ascorbic acid to the system. Another plan is to remove air from the system by subjecting it to vacuum or by flushing it with nitrogen or other non-oxidizing gas. If desired, one can use a combination of addition of a minor proportions of ascorbic acid together with removal of air by flushing with nitrogen.

After the desired methylation has occurred, the plant material may be re-adjusted to its natural pH. This is readily accomplished by incorporation of the required amount of a non-toxic acid such as citric, tartaric, malic, phosphoric, gluconic, etc., or an acidic salt such as an alkali metal dihydrogen phosphate. In cases where pieces of plant material, such as fruit slices, are treated with the enzyme system, it is generally not necessary to re-acidify. The treated fruit may be washed with water to remove the residue of treating solution from the surface thereof.

In another phase of the invention, a simplified treatment is employed which provides the same end result as provided by the above-described treatment with O-methyltransferase. Thus, by applying this simplified treatment the browning precursors are altered so they are no longer affected by the oxidative enzymes whereby the browning mechanism is blocked in its first stage. Since the same blocking effect is obtained, it is possible that in this case there also occurs a conversion of ortho-hydroxyl groups to methoxyl groups caused by methylating enzymes and sources of methyl-donating compounds naturally present in the plant material. However, it may be that the mechanism of blocking is different and involves conversion of ortho-hydroxyl groups to some type of groups other than methoxyl but which still render the browning precursors incapable of being oxidized to ortho quinones. The treatment in question essentially involves exposing the plant material to a pH of about from 7 to 9 and holding it under anaerobic conditions. The pH adjustment may be accomplished as described above in connection with the O-methyltransferase treatment. Anaerobic conditions are also provided as described above. In this simplified process of the invention, one eliminates the use of O-methyltransferase and its adjuncts (methyl-donating agent and magnesium ion). In a typical application of this phase of the invention to the treatment of solid plant material such as fruit slices, the slices are placed in an aqueous solution maintained at a pH about from 7 to 9 and held therein under anaerobic conditions. Where the plant material is in liquid form such as a juice, pulp, or puree, the liquid is adjusted to the proper pH level (about 7–9) and held under anaerobic conditions. The temperature of the treatment may vary from about 20 to 40° C. and the time for treatment will vary on such factors as the temperature, the type of produce, its content of enzymes and methyl-donating compounds, the desired degree of stabilization to be attained, etc. Taking these factors into account, the process may require anywhere from 5 minutes to 3 hours. After the treatment has been carried out as above described, the plant material is preferably re-acidified or washed as explained above in connection with the enzyme treatment.

As noted hereinabove, the simplified treatment in accordance with the invention requires the presence in the plant material of certain enzymes capable of blocking the reactive groups of the browning precursors. In some cases the plant material may be deficient in such enzymes or in requisite blocking reagents such as methyl-donating compounds. It is obvious that in such case it would be necessary to add to the treating solution an enzyme preparation such as O-methyltransferase and/or methyl-donating compounds capable of producing the desired blocking effect. Whether or not any given sample of plant material contains the requisite natural components can be determined by conducting pilot experiments, one using the treatment with added O-methyltransferase and methyl-donating compounds and the other without such additives. The results obtained then furnish the information needed; that is, whether the treatment will be effective per se or whether addition of O-methyltransferase and/or methyl-donating components is required.

In applying the processes of the invention to solid plant materials such as fruit pieces, the mode of applying the solution to the plant material may be varied, depending on the desired degree of penetration of the solution into the plant tissue. For example, if it is desired to inhibit browning mainly in the surface layers of the plant tissue, the solution is applied to a dipping or immersing technique without making an effort to achieve a deep penetration of the solution into the plant tissue. Such technique is employed particularly in cases where the product is to be preserved for relatively short periods of time and the enzymes and browning precursors deep within the pieces are in their natural organization and hence are relatively unlikely to develop browning. The treatment in such instances is particularly required at the surface where the natural cell structure has been disrupted by peeling, cutting, etc., and this surface is exposed to the atmosphere. Application by dipping is also suitable where the pieces of plant tissue are of small dimensions so that the solution can penetrate throughout the tissue during the period of treatment. In situations where the produce being treated is in larger pieces, or where it is intended the complete precursor blocking be accomplished for keeping the products indefinitely, then it is preferred to effect the treatment by vacuum impregnation. This technique, as well known in the art in other applications, involves immersing the plant material in the treatment solution and subjecting the system to vacuum to draw air or other gases out of the tissue. The vacuum is then released, whereby the solution penetrates into the innermost recesses of the plant tissue. To obtain utmost contact between the solution and the browning precursors in the tissue, the vacuum treatment may be repeated several times, applying flushing with nitrogen or other inert gas between successive vacuum treatments. It is further evident that where plant material has been treated in such manner it is desirable to apply the neutralization solution by the same vacuum technique to ensure re-acidification deep within the plant tissue.

As explained hereinabove, after treatment of the plant material by either of the two types of treatment solution, the plant material may be re-acidified or brought back to its natural pH. In the treatment of solid food products such as slices of fruit, it is generally adequate to wash the slices with water without re-acidifying.

Following application of the treatment herein described, the plant material may be subjected to any desired preservation treatment employing conventional techniques for such purpose as, for example, freezing, dehydration, brining, canning, or various combinations of these, such as dehydrofreezing or dehydrocanning. Where the products are to be kept for relatively short periods of time in the raw state, they may be kept in cold storage (about 32–50° F.). Such treatment is adapted for instance, in the production of pre-peeled fresh potatoes for use as stock for preparing various potato dishes by restaurants, hotels, etc. To this end, potatoes are peeled, subjected to dipping in the solutions herein described, packaged in cellophane bags and preserved at about 32–50° F. during distribution and storage. Such products are, of course, not intended to keep indefinitely but only for about 7 to 12 days.

The invention is applicable to any type of edible plant material as, for example, potatoes, sweet potatoes, carrots, peas, beans, cabbage, cauliflower, squash, spinach, broccoli, asparagus, artichokes, mushrooms, peaches, pears, apples, nectarines, apricots, figs, dates, etc. To assist in obtaining good penetration of the treating agents the produce is initially reduced into small pieces as by dicing, slicing, shredding, or the like. Such comminution is especially desirable in the processing of the larger-sized items such as white or sweet potatoes, cabbage, cauliflower, and the like.

The invention is further demonstrated by the following illustrative examples:

*Example I*

Fresh apples were sliced while immersed under water containing 0.1% ascorbic acid (to prevent browning of the apple tissue before application of the treatment).

A 3% solution of $K_2HPO_4$ in water was prepared and flushed with nitrogen. The pH of the solution was 8.9. The apple slices were placed in the solution and held therein in a closed vessel at room temperature for 2 hours.

The apples were removed from the solution and it was observed that their tissue was white in color. Some of the treated slices were dipped in a dilute solution of potassium dihydrogen phosphate acid (to restore their natural pH) and allowed to stand exposed to air. It was observed that the tissue remained white for at least 48 hours.

Control samples of the same apple slices—one lot held in deaerated water for 2 hours and another lot kept in air for 2 hours—were both brown.

*Example II*

The process of Example I was repeated except that in this case the solution of $K_2HPO_4$ was replaced by a 0.3 molar solution of tris-(hydroxymethyl) aminomethane hydrochloride. It was observed that the treated apple slices were white in color, as removed from the treating solution, and after acidification and holding in air for 24 hours.

*Example III*

Fresh apples were squeezed to prepare a juice and 0.01% of ascorbic acid was added to the juice to prevent browning before application of the treatment.

Fifty volumes of this apple juice were mixed with:

25 volumes of an O-methyltransferase preparation containing 89 mg. protein/ml.
15 volumes of S-adenosylmethionine solution (0.008 M)
5 volumes of magnesium chloride solution (0.2 M)
5 volumes of tris-(hydroxymethyl) aminomethane hydrochloride solution (2 M)

The resulting mixture, having a pH of 7.5 to 8, was evacuated to remove air and held in a closed vessel at 38° C. for 2 hours. At the end of this time the pH of the solution was brought to 6 by addition of $KH_2PO_4$.

As a test, a sample of the above product and a sample of the original juice (diluted with water to same concentration as the product) were shaken in air for several hours, then examined. The treated juice had a pale straw color exactly like the freshly-prepared juice; the untreated juice was dark brown.

Having thus described the invention, what is claimed is:

1. A process for preserving the natural color of plant material which comprises immersing fresh edible plant material in an aqueous solution containing an alkaline material in a concentration to provide a pH about from 7 to 9, said solution further containing the enzyme O-methyltransferase in the event that said plant material is lacking in enzymes capable of blocking the reactive groups of browning precursors, holding the plant material in said solution under anaerobic conditions at a temperature about from 20° to 40° C. for a period in the range from 5 minutes to 3 hours until its color is stabilized, separating the plant material from the aqueous solution, and removing residual aqueous solution from the surface of the plant material.

2. A process for preserving the natural color of fruit which comprises immersing fruit pieces in an aqueous solution of an alkaline material in a concentration to provide a pH about from 7 to 9, said solution further containing the enzyme O-methyltransferase in the event that said fruit is lacking in enzymes capable of blocking the reactive groups of browning precursors, holding the fruit pieces in said solution under anaerobic conditions at a temperature about from 20° to 40° C. for a period in the range from 5 minutes to 3 hours until the natural color of the fruit pieces is stabilized, separating the fruit pieces from the solution, and removing residual solution from the surface of the fruit pieces.

3. A process for preserving the natural color of apples which comprises immersing fresh apple pieces in an aqueous solution containing an alkali metal phosphate in a concentration to provide a pH about from 7 to 9, and holding the apple pieces in said solution under anaerobic conditions at a temperature about from 20° to 40° C. for a period of about 2 hours until the natural color of the apple pieces is stabilized, said anaerobic conditions being established by flushing with nitrogen.

4. A process for preserving the natural color of plant material which comprises immersing fresh edible plant material in an aqueous medium containing the enzyme O-methyltransferase and an alkaline material in a concentration to provide a pH about from 7 to 9, holding the plant material in said solution under anaerobic conditions at a temperature about from 20° to 40° C. for a period in the range from 5 minutes to 3 hours until its color is stabilized, separating the plant material from the aqueous medium, and removing residual aqueous medium from the surface of the plant material.

References Cited in the file of this patent

UNITED STATES PATENTS

| | | |
|---|---|---|
| 2,336,928 | Denny | Dec. 14, 1943 |
| 2,738,280 | Makower et al. | Mar. 13, 1956 |
| 2,857,282 | Jansen | Oct. 21, 1958 |
| 2,860,055 | Jansen | Nov. 11, 1958 |
| 2,946,690 | Scharf | July 26, 1960 |

OTHER REFERENCES

Food Technology, December 1959, pp. 722 to 726 (article by Bodrosian et al.). (Copy in Scientific Library.)